United States Patent Office 2,819,176
Patented Jan. 7, 1958

2,819,176

STABILIZED COLLOIDAL TITANIA MONO-HYDRATE SUSPENSIONS

Richard D. Vartanian, Bound Brook, N. J., assignor to American Cyanamid Company, New York, N. Y., a corporation of Maine No Drawing. Application February 11, 1954
Serial No. 409,780

4 Claims. (Cl. 106—308)

This invention relates to aqueous dispersions of negatively charged titania monohydrate with a particle size less than about 0.1 micron and to the process of preparing the same, and to the use of said negatively charged hydrous titania aqueous dispersions in the treatment of textile materials such as textile fibers and fabrics such as flat fabrics and pile fabrics, for the purpose of imparting soil resistant properties thereto.

One of the objects of the present invention is to produce a negatively charged titania monohydrate in aqueous dispersion with a particle size less than about 0.1 micron. A further object of the present invention is to use a dispersion of this type in the treatment of textile materials such as textile fibers, and fabrics such as flat fabrics and pile fabrics for the purpose of imparting soil resistant properties thereto. These and other objects of the present invention will be discussed more fully hereinbelow.

In preparing the negatively charged hydrous titania aqueous dispersion of the present invention, one neutralizes an aqueous titania monohydrate slurry to a pH of about 7.0–7.2. The titania hydrate slurry is derived from the titanium ore which has been digested in sulfuric acid; then hydrolyzed, filtered, washed, reslurried and washed again in a conventional Moore filter until the so-called third Moore filter cake is derived. This filter cake is reslurried and then neutralized as indicated hereinabove to a pH of about 7.0–7.2. The neutralized slurry is then filtered and washed with water so as to remove substantially all of the sulfate ions from the filter cake. The desulfated filter cake is reslurried in water and acidified to a pH below 5 with a monobasic inorganic acid such as hydrochloric, hydroiodic, hydrobromic, hydrofluoric, nitric, nitrous and the like. This acidifying step produces an opalescent milky liquid. The crux of the invention resides in the adjustment of the pH to a value greater than 5 and preferably between 5 and 11. For optimum operating conditions, the pH is preferably adjusted to 7–9.5. The materials utilized in the adjustment of the pH are critical. The materials utilized are ammonia and an acid selected from the group consisting of water soluble aliphatic acids and water soluble polybasic inorganic acids. Obviously, in the place of ammonia, aqueous solutions of ammonia can be utilized and, in fact, are preferred to the gaseous ammonia. This would, of course, result in the use of ammonium hydroxide. The acid component of the mixture may be citric, tartaric, glycolic, gluconic, lactic, acetic, oxalic, phosphoric, orthophosphoric, sulfuric, sulfurous and the like. Obviously, these acids may be used either singly or in combination with one another in the mixture with ammonia. In raising the pH of the initial acidic colloidal dispersion of titania monohydrate above 5, the ammonia must, of course, be present in stoichiometric excess relative to the aliphatic or polybasic inorganic acid as is illustrated in the detailed examples hereinbelow. Moreover, the ammonia must be added either along with or subsequent to the addition of said acid in order to avoid the precipitation caused by inorganic alkalizing agents which is described in my application Serial No. 394,513, filed November 25, 1953, of which this application is a continuation-in-part.

In order that the present invention may be more completely understood, the following examples are set forth in which all parts are parts by weight except where otherwise indicated. These examples are set forth primarily for the purpose of illustration and any specific enumeration of detail contained therein should not be interpreted as a limitation on the case except as indicated in the appended claims.

*Example 1*

Into a suitable reaction vessel equipped with a stirrer, there are introduced 6,000 parts of a titania monohydrate slurry (third Moore filter cake, slurried with water), containing 1,890 parts of anhydrous titanium dioxide. While continuously stirring the charge, 600 parts of iron-free water and 575 parts of a 14% ammonium hydroxide solution are added. After thoroughly stirring to a pH of about 7.2 the neutralized slurry is filtered through a Buchner funnel and washed with iron-free water until the filtrate is substantially completely free of $SO_4$ ions. The filter cake has a calcined solids content of 38%. 4210 parts of the filter cake is diluted with 2190 parts of iron-free water. While stirring the diluted filter cake at a slow speed, there is added 220 parts of a concentrated hydrochloric acid (37–38% HCl). The stirring is continued for about 30 minutes after the acid addition until an opalescent milky liquid is obtained. The resulting colloidal dispersion has a $TiO_2$ content of 24.2%.

*Example 2*

82.7 parts of the acid peptized titania monohydrate prepared according to Example 1 are added with stirring to a solution containing 3 parts of a 50% solution of gluconic acid and 5 parts of water. The dispersion, thus prepared, is added with high speed stirring to a solution containing 4 parts of concentrated ammonium hydroxide (28% $NH_3$) and 5.3 parts of water. The resulting colloidal dispersion has a pH of 8.0 and an average particle size less than 0.1 micron.

*Example 3*

5 parts of the neutralized colloidal titania monohydrate prepared in accordance with Example 2 are dispersed in 95 parts of water and transferred to a shallow container. A piece of white wool rug is placed face down in the dispersion, the depth of the charge is sufficient to wet the pile only. This gives a wet pick-up of about 50% by weight based on the total weight of the rug which is equivalent to about 100% wet pick-up based on the total weight of the pile. The thus treated rug is dried at 100° C. in a forced draft oven. The treated piece and an untreated control are fastened to two 5″ x 5″ windows in a revolving drum for the purpose of exposing the treated and control pieces to soil. Two grams of a synthetic soil is entered into the drum, the opening is closed and the drum is rotated for 20 minutes. The samples are then removed, vacuum cleaned and the treated sample is compared with the control in order to evaluate the effectiveness of the treatment for imparting soil resistance. The treated carpet is light gray in color while the untreated carpet is practically black.

*Example 4*

Into a suitable reaction vessel equipped with a stirrer, there is introduced 600 parts of a titania monohydrate slurry (third Moore filter cake slurried with water) containing 200 parts of titanium dioxide. While continuously stirring the charge, 1000 parts of water and 51 parts of a 14% ammonium hydoxide solution are added. After thoroughly stirring to a pH of about 7.2, the neutralized slurry is filtered through a Buchner funnel and washed with water until the filtrate is substantially completely free of $SO_4$ ions. The filter cake has a calcined solids content of 38%. 517 parts of the filter cake, thus produced, is diluted with 233 parts of water and 36 parts of a concentrated hydrochloric acid (37–38%). The stirring is continued for about 30 minutes after the acid addition until an opalescent, milky liquid is obtained. The resulting colloidal dispersion has a $TiO_2$ content of 25%.

*Example 5*

80 parts of the acid peptized titania monohydrate prepared in Example 4 are introduced with constant stirring into a solution containing 1 part of citric acid and 5 parts of water. The dispersion thus produced is added with high speed stirring to a solution containing 6 parts of concentrated ammonium hydroxide (28% $NH_3$) and 8 parts of water. The resulting colloidal dispersion has a pH of 8.2.

*Example 6*

5 parts of the neutralized colloidal titania monohydrate prepared in accordance with Example 5 are dispersed in 95 parts of water and transferred to a shallow container. A piece of white wool rug is placed face down in the dispersion, the depth of the dispersion is sufficient to wet the pile of the rug only. This gives a wet pick-up of about 50% by weight based on the total weight of the rug which is equivalent to about 100% wet pick-up based on the total weight of the pile. The thus treated rug is dried at 100° C. in a forced draft oven. In all other respects, the procedure according to Example 3 is repeated. The treated carpet, after vacuum cleaning, is light gray in color, while the untreated carpet, after vacuum cleaning, is practically black.

The particle size of the titania hydrate in the dispersion should be less than about 0.1 micron and preferably, for commercial operations, between about 0.02 and 0.075 micron. The amount of solids of the titania hydrate which may be utilized in the treatment of textile fibers and fabrics will cover a rather wide range such as between about 0.1 and 5% by weight based on the total weight of the aqueous dispersion. It is preferred, however, that the concentration of solids in the dispersion be between about 0.5 and 1.5% by weight. For optimum operability and results, the concentration is generally held at about 1% solids by weight. The particle size in any given dispersion will not be completely uniform, but it is imperative that the size of the particles in the dispersion be less than about 0.1 micron.

The textile treating process of the present invention may be applied to fibers such as wool, silk, cotton, linen, and synthetic fibers such as those derived from linear super polyamides, linear polyesters, polyacrylonitrile and the like and fabrics containing these fibers and mixtures thereof.

In addition to imparting soil resistance to the treated fibers, the process of the present invention also imparts slip resistance to the fibers and also produces fibers which are free of the defect of whitening, particularly when the treatment is applied to black dyed fabrics or those dyed with dark shades. By practicing the process of the present invention, the negatively charged hydrated titanium dioxide suspension is applied to fibers, wherein the suspension is composed of particles which are so small that the dispersion is practically colorless. This is advantageous inasmuch as the titania monohydrate particles impart this soil resistant characteristic to the fibers without producing any whitening of the fabric. A further advantage of the present invention resides in the fact that these negatively charged suspensions are stable even in concentrated form and can be stored for long periods of time at room temperature without aggregation or separation thus making it possible to prepare these suspensions in advance of their use. A still further advantage of the present invention resides in the fact that these suspensions can be diluted easily without separation or precipitation. A still further advantage of the present invention resides in the fact that the titanium dioxide monohydrate dispersion is comprised of particles of such minute size that maximum soil resistance can be obtained with a minimum of solids take-up. This means that the process can be carried out at a minimum of additional cost and yet produce these very desirable results. As an additional advantage of the present invention, good slippage control is obtained without appreciably increasing the weight and stiffness of the fabrics so treated. A further advantage of the present invention resides in the fact that the treating composition can be applied to the fabrics from a single bath.

The treating agent may be applied to the fibrous materials by any one of a plurality of conventional treating methods such as by immersion, spraying, or passing the fabric in contact with a quetch-roll, which travels in the treating suspension and carries a film of the treating agent up to and onto the fabric. So called flat fabrics or woven carpets (which do not contain a pile) may be immersed in the suspension and then passed through a wringer to give about 100% wet pick-up by weight based on the weight of the fabric. Pile fabrics, on the other hand, may be passed over a roll with the pile down in such a manner that the pile is just close enough to the surface of the suspension so that the pile is wetted without contacting the adhesive binding on the back of the fabric. Such a batch may be maintained at the desired heighth by utilizing an overflow pipe. Regardless of the manner in which the dispersion is applied to the fabric, the treated fabric is always dried by some conventional means such as by passing the treated fabric over stenters or through hot flues or in loop driers. Pile fabrics should be dried on conventional equipment designed for this purpose in order that the pile remains upright and is not damaged by the aqueous treatment. It is not known exactly how the colloidal titania monohydrate operates to reduce the soiling. Microscopic examination of the fibers fails to indicate the presence of a continuous film on the fibers of the treated material.

In the practice of the process of the present invention, the drying of the impregnated fibers or fabrics can be done at temperatures between about 80 and 115° C. Lower temperatures may be used but they would necessitate lengthening the drying time and, as a consequence, should be avoided. Temperatures higher than 115° C. may also be used but because of the tendency toward the yellowing of the fabrics, these higher temperatures should be avoided particularly when drying white or light colored fabrics. The drying time will depend upon the temperature selected as well as the realtive humidity of the air used for drying. Obviously, with the lower temperatures and higher humidities, the time will be considerably longer than when higher temperatures and lower humidities are used. The important thing to be observed is that the drying be continued until the treated fabric is dry to touch. Those skilled in the art will readily be able to adjust their drying times and the temperatures in order to produce a dried fabric. The drying time, then, may vary between about 5 minutes and 60 minutes, depending upon the other relating conditions. Overdrying to any significant extent is preferably avoided.

This application is a continuation-in-part of application Serial No. 394,513, filed November 25, 1953, and a continuation-in-part of application Serial No. 409,780, filed February 11, 1954.

I claim:

1. A process which comprises acidifying a substantially sulfate ion free aqueous suspension of titania monohydrate to a pH below about 5 with a monobasic inorganic acid and thereafter reversing the charge on the resulting colloidal particles by changing the pH to a value between about 5 and about 11 with an alkalizing agent containing ammonia and a second acid of the group consisting of water-soluble aliphatic acids and water-soluble polybasic inorganic acids, the ammonia being employed in stoichiometric excess relative to the second acid and being introduced into the initial titania hydrate suspension no earlier than said second acid, to produce a stable colloidal suspension of negatively charged substantially uniform titania monohydrate particles less than about 0.1 micron in size.

2. A process according to claim 1 in which the pH is changed to a value between about 7 and about 9.5.

3. A stable colloidal suspension of negatively charged substantially uniform titania monohydrate particles less than about 0.1 micron in size dispersed in an aqueous medium with a pH between about 5 and about 11 and containing a monobasic inorganic acid, an acid of the group consisting of water-soluble aliphatic acids and water-soluble poly-basic inorganic acids, and ammonia in sufficient stoichiometric excess to provide said pH value.

4. A composition according to claim 3 with a pH between about 7 and about 9.5.

References Cited in the file of this patent

UNITED STATES PATENTS

| | | |
|---|---|---|
| 1,962,371 | Tongan | June 12, 1934 |
| 2,028,575 | Tongan | Jan. 21, 1936 |
| 2,357,101 | Geddes | Aug. 29, 1944 |
| 2,448,683 | Peterson | Sept. 7, 1948 |
| 2,534,318 | Swanson | Dec. 19, 1950 |
| 2,622,307 | Cogovan | Dec. 23, 1952 |

FOREIGN PATENTS

| | | |
|---|---|---|
| 22,629 | Great Britain | 1901 |